United States Patent
Tolkachnikov et al.

(10) Patent No.: US 11,141,764 B2
(45) Date of Patent: Oct. 12, 2021

(54) METHOD FOR REMEDIATION OF CONTAMINATED LANDS

(71) Applicants: Yuriy Borisovich Tolkachnikov, Krasnoyarsk (RU); Konstantin Yur'yevich Tolkachnikov, Krasnoyarsk (RU); Yuriy Vladimirovich Kos'yanenko, Krasnoyarsk (RU); Vyacheslav Anatol'yevich Titov, Krasnoyarsk (RU); Dmitriy Nikolayevich Kuznetsov, Krasnoyarsk (RU); Artur Mikhaylovich Gorbunov, Krasnoyarsk (RU)

(72) Inventors: Yuriy Borisovich Tolkachnikov, Krasnoyarsk (RU); Konstantin Yur'yevich Tolkachnikov, Krasnoyarsk (RU); Yuriy Vladimirovich Kos'yanenko, Krasnoyarsk (RU); Vyacheslav Anatol'yevich Titov, Krasnoyarsk (RU); Dmitriy Nikolayevich Kuznetsov, Krasnoyarsk (RU); Artur Mikhaylovich Gorbunov, Krasnoyarsk (RU)

( * ) Notice: Subject to any disclaimer, the term of this patent is extended or adjusted under 35 U.S.C. 154(b) by 0 days.

(21) Appl. No.: 16/637,283

(22) PCT Filed: May 16, 2019

(86) PCT No.: PCT/RU2019/000341
§ 371 (c)(1),
(2) Date: Feb. 7, 2020

(87) PCT Pub. No.: WO2020/022933
PCT Pub. Date: Jan. 30, 2020

(65) Prior Publication Data
US 2020/0246849 A1    Aug. 6, 2020

(30) Foreign Application Priority Data

Jul. 23, 2018   (RU) .......................... RU2018127116

(51) Int. Cl.
*B09C 1/08*   (2006.01)
*B09C 1/02*   (2006.01)
*C09K 17/14*   (2006.01)

(52) U.S. Cl.
CPC .................. *B09C 1/08* (2013.01); *B09C 1/02* (2013.01); *C09K 17/14* (2013.01); *B09C 2101/00* (2013.01)

(58) Field of Classification Search
CPC ......... B09C 1/00; B09C 1/10; B09C 2101/00; B09C 1/08; B09C 1/02; C09K 17/00; C09K 17/14
See application file for complete search history.

(56) References Cited

FOREIGN PATENT DOCUMENTS

| | | |
|---|---|---|
| CN | 106676042 A | 5/2017 |
| RU | 1816394 A3 | 12/1995 |
| RU | 2311237 C1 | 11/2007 |
| RU | 2522616 C2 | 7/2014 |
| RU | 2529735 C1 | 9/2014 |
| RU | 2557636 C2 | 12/2014 |
| RU | 2656379 C1 | 6/2018 |
| RU | 2688282 C1 | 5/2019 |
| SU | 1805097 A1 | 12/1991 |
| WO | 2008/029423 A1 | 3/2008 |
| WO | 2009/125341 A2 | 10/2009 |
| WO | 2015/046416 A1 | 4/2015 |
| WO | 2018/009330 A1 | 1/2018 |
| WO | 2018/087995 A1 | 5/2018 |

OTHER PUBLICATIONS

Azubuike et al. Bioremediation techniques—classification based on site pf application: principles, advantages, limitations and prospects, World Journal Microbiology and Biotechnology, vol. 32, p. 1-18. (Year: 2016).*
Plociniczaketal., Improvement of phytoremediation of an aged petroleum hydrocarbon-contaminated soil by Rhodococcus erythropolis CD106 strain. International journal of Phytoremediation, abstract (Year: 2017).*
Translation of SU1816394 (Year: 1995).*
Translation of RU2557636 (Year: 2013).*
Translation of CN 106676042 (Year: 2017).*

* cited by examiner

*Primary Examiner* — Taeyoon Kim
*Assistant Examiner* — Tiffany M Gough

(57) ABSTRACT

The invention relates to agriculture and can be used to restore soil fertility. A method for remediation of contaminated lands involves pouring and introducing a bioreagent to a depth into the soil prepared for purification. Remediation is carried out in 2 steps: in the first step, slit-like or round holes are made in the infected area to a depth of 25 cm, poured with water, afterwards, 5-6 hours later, this area is poured with a bioreagent in the form of a humus-containing suspension in an amount of up to 400 g per kg of soil containing strains: *Acinetobacter calcoaceticus* VKPM V-4883, *Pseudomonas denitrificans* VKPM-4884, *Pseudomonas* sp. "*longa*" VKPM V-4885, *Rhodococcus erythropolis* in an amount of $(6\text{-}8)\cdot 10^9$, $(3\text{-}4)\cdot 10^9$, $(2\text{-}3)\cdot 10^9$, $(1\text{-}2)\cdot 10^9$ cells per 1 L of solution, respectively, in the ratio, wt. % 4.8:2.4:1.7:1.0. In the second step, 8-10 days later, half the initial dose of the concentrate of the humus-containing suspension is introduced. After introduction of the second reduced dose of the humus-containing suspension, watering is continued for 14 days. The distance between the slit-like or round holes is 8-10 cm. The proposed method for remediation of contaminated lands provides for treatment efficiency and a reduction in the degree of decontamination from a high degree of contamination to the MPC (maximum permissible concentration) level, preservation of soil biocenosis and restoration of soil fertility.

2 Claims, No Drawings

METHOD FOR REMEDIATION OF CONTAMINATED LANDS

The invention relates to agriculture and can be used in the manufacture of preparations that restore soil fertility, fertilizers, plant protection products, and other preparations that reduce the man-made impact on nature and stimulate the growth and development of plants.

As a result of chemicalization, mechanization and land reclamation in agriculture as well as global industrial contamination of the environment, widespread soil degradation is observed. Therefore, there is a pressing need for the development and introduction of organic fertilizers that restore soil fertility and have a versatile positive effect on plant growth.

It is known that humic biologically active substances have a multifaceted effect on soil fertility, on the growth and development of plants. Currently, many types of fertilizers based on humic acids are known.

For example, a method of producing a preparation of humic acids for soil formation, (inventor's certificate RF No. 1213760) is known. The preparation is prepared from coal industry wastes inoculated with microorganisms, followed by cultivation of an aqueous suspension for 10-15 days before the lysis of bacterial cultures. In the course of preparing the preparation, phenol is introduced into the aqueous suspension twice, which is a source of organic carbon for the life activity of microorganisms.

However, phenol is also a bactericidal substance leading to the lysis of microorganisms, i.e. a preparation that does not contain active microflora, becomes less active. In said known solution, long preparation of the preparation (10-15 days) as well as the limited content of live bacterial cells in the preparation on account of their lysis and the addition of phenol to the preparation as a carbon source, indicate the disadvantages of this preparation.

A method of soil treatment (WO/2018/087995 PCT/JP2017/031016 dated 17 May 2018 TAKENAKA CORPORATION INABA, Kaoru) is known, wherein a decomposing microorganism for decomposing a contaminant in underground soil is mixed, heated to a temperature above ground water temperature and fed into underground soil by injection into injection wells.

The disadvantage of the known method is that to activate the decomposition of the contaminant, a heating process is necessary, which leads to additional energy consumption.

There is known WO/2018/009330. Two-stage recovery of granular material with organic contaminants PCT/US2017/037858, in which the methods and systems are provided for two-stage treatment of a contaminated particulate material (100) such as soil, settling and/or settled sludge. The methods and systems use a thermal desorption process in combination with a glow discharge combustion process. The contaminated particulate material is first subjected to thermal desorption at high temperatures (for example, greater than 150° C.) to form a heated contaminated particulate material. Afterwards, the glow discharge combustion process is initiated by introducing a combustion supporting gas. The combined process may occur in the same or different processing plants. The treatment of the particulate material by thermal desorption method prior to the glow discharge combustion process increases the completeness and throughput in comparison with the operation of these processes separately.

The disadvantage of the known methods is that, to activate the decomposition of the contaminant, a heating process and combustion are necessary, which leads to additional energy consumption and a complicated process of soil disinfection.

A method of RU 2529735, 30 Jan. 2013, publ. 27 Sep. 2014 bul. No. 27 is known, the invention relates to biotechnology, in particular to microbiological methods for purification of the environment. A mixture of liquid bacterial cultures is prepared, which are represented by the strains *Pseudomonas fluorescens* VKG ("BKF") RCAM00538 with a titer of $10^{-13}$, KOA-4 *Pseudomonas fluorescens* ND-610 ARRIAM with a titer of $10^{-10}$, *Azotobacter chroococcum* AIN ("АИН") RCAM00539 with a titer of $10^{-12}$ in the ratio 3:1.5:0.5-3:2:1, respectively. Brown coal enrichment waste is treated by adding the produced liquid mixture of strains thereto, followed by stirring and drying the prepared mixture for at least 2.5 days at room temperature, brown coal enrichment waste and the premixed mixture of strains being taken in the ratio, wt. %, 40-50:50-60, respectively. The invention allows for increasing the content of humic, carboxylic, amino acids and polysaccharides in the biopreparation at minimal costs and time for its manufacture.

However, to produce a dry biopreparation a considerable period of time of 4-5 hours and considerable costs are required. In addition, a dry biopreparation loses its properties over time and is not suitable for use in a year. The dry preparation cannot serve as an inoculum for the subsequent cycle of its production. Each time one needs to produce a new biopreparation of the same composition for 4-5 days.

The closest in terms of technical essence and the achieved result is a method for producing a humic-mineral reagent (RU № 22522616 dated 5 Oct. 2012, publ. 20 Jul. 2014 bul. No. 20), the invention relates to the field of ecology and environmental restoration, in particular to preparations of humic substances from natural organic substrates, their production and use for purification of contaminated soils. The humic-mineral reagent is produced by mixing humified organic raw materials with a solution of hydroxide of alkaline or alkaline-earth metals, followed by extraction. Extraction of humic substances is carried out at 165-220° C. and a pressure of 1.8-2.5 MPa with a simultaneous supply of air with a flow rate of no more than 5 litres per minute per 10 kg of raw materials for no more than 3 hours. The produced reagent contains humic acids and/or their salts, a mixture of mineral components including iron oxide, sodium oxide, magnesium oxide, aluminium oxide, calcium oxide, and less than 1.5 wt. % of impurities. The invention allows for producing a new environmentally and cost-effective humic-mineral reagent with a high yield from organic wastes, the use of which provides for effective purification of contaminated soils, and accelerating the processes of recultivation.

A method of using a humic-mineral reagent for purification of contaminated soils, which consists in intensive ripping and applying sorbent and chemical ameliorant to the soil prepared for purification, intensive pouring by sprinkler irrigation and subsequent sowing of phytomeliorants.

However, in this method, intensive ripping of the infected soil is necessary, and without additional introduction of microorganisms, the process of restoration of soil biocenosis will be long. Violation of the concentration of the humic-mineral reagent when water pouring, due to the high pH, can lead to inhibition of plant growth.

The purpose of the claimed invention is to develop a technology of biological remediation of contaminated soils that would ensure the lowest manufacturing costs.

The technical result of the proposed method is treatment efficiency and reducing the degree of decontamination from a high degree of contamination to the MPC level, maintaining soil biocenosis and restoring soil fertility, improving the environment in industrial cities and restoring disturbed lands, returning them to agricultural circulation.

The purpose is achieved by the fact that in the method for remediation of contaminated lands, which consists in pouring and introducing an appropriate type of bioreagent to depth into the soil prepared for purification, remediation is carried out in 2 steps: in the first step, slit-like or round holes are made in the infected area to a depth of 25 cm, poured with water, afterwards, 5-6 hours later, this area is poured with the bioreagent in the form of humus-containing suspension in an amount of up to 400 g per kg of soil containing strains: *Acinetobacter calcoaceticus* VKPM V-4883, *Pseudomonas denitrificans* VKPM-4884, -*Pseudomonas* sp. "*longa*", VKPM V-4885, *Rhodococcus erythropolis* in an amount of (6-8)·10$^9$, (3-4)·10$^9$ (2-3)·10$^9$, (1-2)·10$^9$ cells per 1 L of solution, respectively, in the ratio, wt. %, 4.8:2.4:1.7:1.0, afterwards, the infected area of land is poured with water, and in the second step, 8-10 days later, half the initial dose of the concentrate of the humus-containing suspension is introduced, after introduction of the second, reduced dose of the humus-containing suspension, water pouring is continued for 14 days. The distance between the slit-like or round holes is 8-10 cm.

To achieve the technical result in the method for producing the biopreparation for purification and restoring fertility of soils contaminated with oil products, based on a filler and bacterial cultures, according to the invention, a mixture of liquid bacterial cultures is prepared, which are represented by the following strains: *Acinetobacter calcoaceticus* VKPM-4883 strain, *Pseudomonas denitrificans* VKPM 4884, strain, *Pseudomonas* sp. "*longa*" VKPM-4885, strain and, *Rhodococcus erythropolis* in an amount of (6-8)·10$^9$, (3-4)·10$^9$, (2-3)·10$^9$, (1-2)·10$^9$ cells per 1 litre of solution, respectively, in the ratio, in %, 4.8:2.4:1.7:1.0 and oxidized brown coals pre-screened from particles larger than 5 mm. The nutrient mixture for inoculating it with microorganisms consists of oxidized brown coal and nitrogen- and phosphorus-correcting additives. Said bacteria were produced by long adaptation of the association of soil microorganisms that oxidize carbon-containing substrates.

The strain *Acinetobacter calcoaceticus* is grown for 2 days at 28° C. on a nutrient agar with the following composition: agar 2%, peptone 0.5%, sodium acetate 0.5%, yeast hydrolyzate-0.5%, dist. water is the rest, pH 7.0.

The strains *Pseudomonas denitrificans* and *Pseudomonas* sp. "*longa*" are grown for 2 days at a temperature of 28 degrees on a nutrient agar with the following composition: glucose 1%, yeast hydrolyzate 0.5%, dipotassium phosphate 0.1%, diammonium phosphate 0.1%, magnesium sulphate 0.05%, calcium chloride 0.01%, agar 2%, iron sulphate and sodium chloride—traces, the rest is distilled water, pH 7.0.

The strain *Rhodococcus erythropolis* is grown on a mash—agar, MPA (meat-and-peptone agar), on Raymond's medium, for 22 hours at a temperature of 28-32 degrees, pH 6.8-7.2. Together, the strains have a high fermentation ability to decompose carbon-containing substrates, including sooty brown coals.

The raw biomass is washed off from the colonies of microorganisms grown on a nutrient agar with distilled water to a fermentation vessel, determining beforehand the number of cells under a microscope. Afterwards, the nutrient mixture consisting of sooty brown coals with additives, micro- and macroelements in the composition of sooty coals, is inoculated with the mixture of bacterial strains, in the ratio 4.8:2.4:1.7:1.0 with active stirring in the presence of atmospheric oxygen, adding water and at a temp. of 20-25 degrees for 25-28 hours until the number of strains in this mixture is reached: strain No. 10, *Pseudomonas denitrificans* VKPM 4884, *Pseudomonas* sp. "*longa*" VKPM-4885, and *Rhodococcus erythropolis* in an amount of (6-8) 10$^9$, (3-4) 10$^9$, (2-3) 10$^9$, (1-2) 10$^9$ cells per 1 litre of solution, respectively, in the ratio, wt. % 4.8:2.4:1.7:1.0.

All said strains used in the claimed method for remediation of contaminated lands: *Acinetobacter calcoaceticus* VKPM V-4883, *Pseudomonas denitrificans* VKPM-4884, *Pseudomonas* sp. "*longa*", VKPM V-4885, have been deposited in NBC VKPM (National Bioresource Center "All-Russian Collection of Industrial Microorganisms"), are viable, the certificate copies are enclosed.

*Rhodococcus erythropolis* is not new, the fact that it is known is confirmed in an article in Multitopic Online Electronic Scientific Journal of Kuban State Agrarian University, 2012, UDC 579.6.

The article deals with biotechnological properties of the oil oxidizing strain *Rhodococcus erythropolis* B2, which allow it for being used as a basis for a biopreparation: a degradative potential towards hydrocarbons, characteristics of growth on various media, production of phytohormones and biological surfactants, adhesive activity and floatability, tests in a laboratory environment and in the field.

In addition, the strain *Rhodococcus erythropolis* B2 has been used in SU 1805097 dated 6 Dec. 1991, the applicant is Ufa Petroleum Institute.

"The strain of bacteria *Rhodococcus erythropolis* used for purification of water and soil from petroleum and petroleum products" is included in the following categories *Rhodococcus erythropolis* M 2 VKM AS1339D, stays active in the soil as well. The research has revealed biodegradation of petroleum. 40 days later the biodegradation of petroleum and petroleum products after cultivation was 76%. During control, natural petroleum loss was 0.01 g. The amount of petroleum and petroleum products decreased from 3% to 1%, and 60 days later it decreased to 0.21%.

Remediation of infected lands is carried out in two steps.

In the first step, slit-like or round holes are made in the infected area to a depth of 25 cm of the infected soil with soluble fluorine salts exceeding the MPC by 1.5-5.0 or more times, it is poured with water, which penetrates through the holes or slits made throughout the whole volume of soil. Afterwards, 5-6 hours later, this area is poured with a bioreagent in an amount of up to 400 g per kg of soil. In this case, the interaction of soluble fluorine salts with humic acids into insoluble complexes occurs. Afterwards, the infected area of land is poured with water, and 8-10 days later the infection degree of the soil is examined prior to the second step of decontamination. Afterwards, half the initial dose of the concentrate of the humus-containing suspension is introduced, which consists of the following strains:

*Acinetobacter calcoaceticus* VKPM-4883, *Pseudomonas denitrificans* VKPM 4884, *Pseudomonas* sp. "*longa*" VKPM-4885, and *Rhodococcus erythropolis* in an amount of (6-8)·10$^9$ (3-4)·10$^9$, (1.5-2)·10$^9$ (1-1.5)·10$^9$, (0.5-1.5) 10$^9$ cells per 1 L of solution, respectively, in the ratio of 4.8:2.4:1.7:1.0. The bulk of soluble fluorine salts interacted with water-soluble humic acids, the amount of which decreased due to the creation of insoluble complexes of the bulk of soluble fluorine salts and due to the binding of salts of heavy metals and other contaminants, and a portion of soluble humic acids will leak into the underlying beds, failing to bind soluble fluorine salts in due time.

After introduction of the second reduced dose of the humus-containing suspension, continuous water pouring is continued for 14-16 days until the content of the soluble fluorine salts in the soil amounts to the MPC of 10 mg/kg of soil and until the content of fluorine salts amounts to no more than 10-15 mg per kg of soil.

The distance between the slit-like or round holes is 8-10 cm. This is justified by the fact that, depending on the composition of the soil, the penetration of the bioreagent varies, and empirical studies have shown that 4-5 cm horizontally is optimal.

The results and doses of introduction of the bioreagent are summarized in the table.

TABLE

Relationship between the content of water-soluble fluorine salts and dose of introduction of a bioreagent

| Introduction of a bioreagent to a depth of, cm | Steps | Dose of introduction of the humus-containing suspension, g/kg of soil | | |
|---|---|---|---|---|
| | | 0 | 200 | 400 |
| 25 | 1 | 48 | 34 | 24 |
| | 2 | — | 9 | — |

The proposed method for remediation of contaminated lands provides for treatment efficiency and a reduction in the degree of decontamination from a high degree of contamination to the MPC (maximum permissible concentration) level as well as preservation of soil biocenosis and restoration of soil fertility.

The invention claimed is:

1. A method for remediation of contaminated lands, consisting of:
    i) making slit-like or round holes in soil contaminated with soluble fluorine salts to a depth of 25 cm,
    ii) pouring the contaminated soil with water,
    iii) 5-6 hours later, pouring the soil with a bioreagent in the form of humus-containing suspension in an initial dose of an amount of up to 400 g per kg of soil containing strains: *Acinetobacter calcoaceticus* VKPM V-4883, *Pseudomonas denitrificans* VKPM-4884, *Pseudomonas* sp. VKPM V-4885, *Rhodococcus erythropolis* in an amount of $6\text{-}8\times10^9$, $3\text{-}4\times10^9$, $2\text{-}3\times10^9$, and $1\text{-}2\times10^9$ cells per 1 L of solution, respectively, in the ratio (wt. %) of 4.8:2.4:1.7:1.0,
    iv) pouring the contaminated soil with water, and,
    v) 8-10 days later, half the initial dose of the humus-containing suspension is introduced, and water pouring is continued for 14 days.

2. The method for remediation according to claim 1, wherein the distance between the slit-like or round holes is 8-10 cm.

* * * * *